(No Model.) 6 Sheets—Sheet 2.
F. S. COOK.
NUT TAPPING MACHINE.
No. 438,605. Patented Oct. 21, 1890.
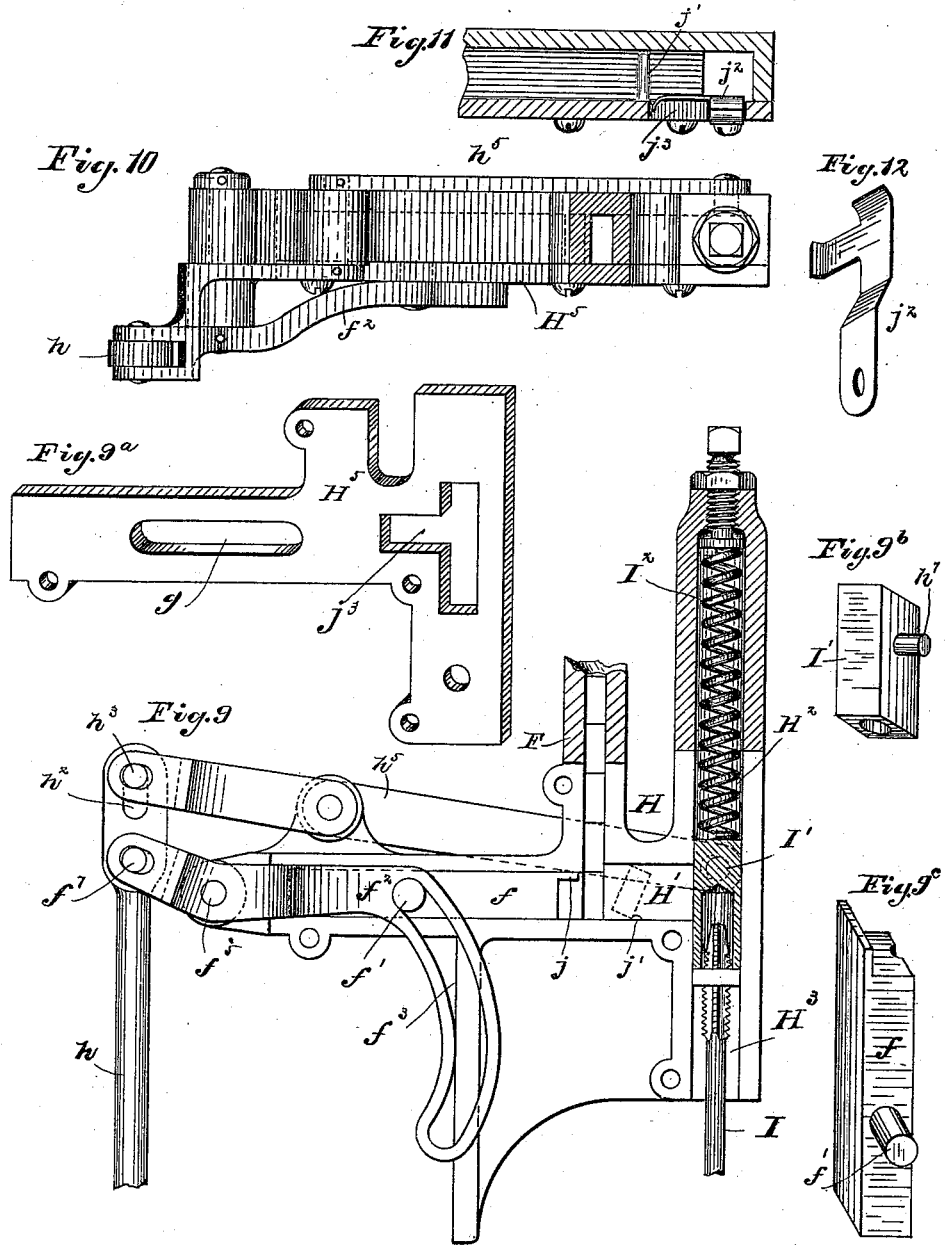
WITNESSES.
L. B. Staley
C. S. Brunnick
INVENTOR.
Frank S. Cook
by Paul A. Staley
Atty.

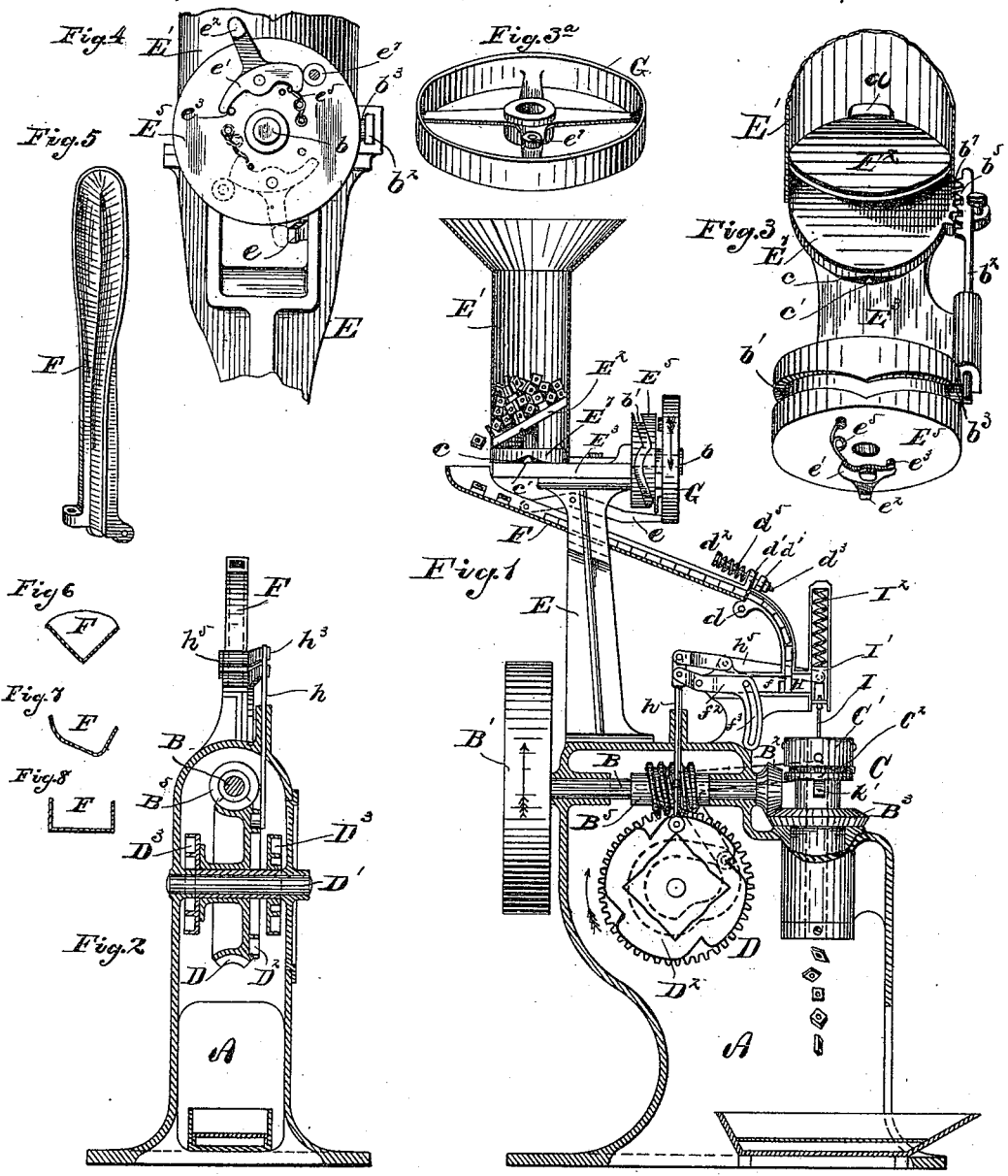

(No Model.) 6 Sheets—Sheet 3.
F. S. COOK.
NUT TAPPING MACHINE.
No. 438,605. Patented Oct. 21, 1890.
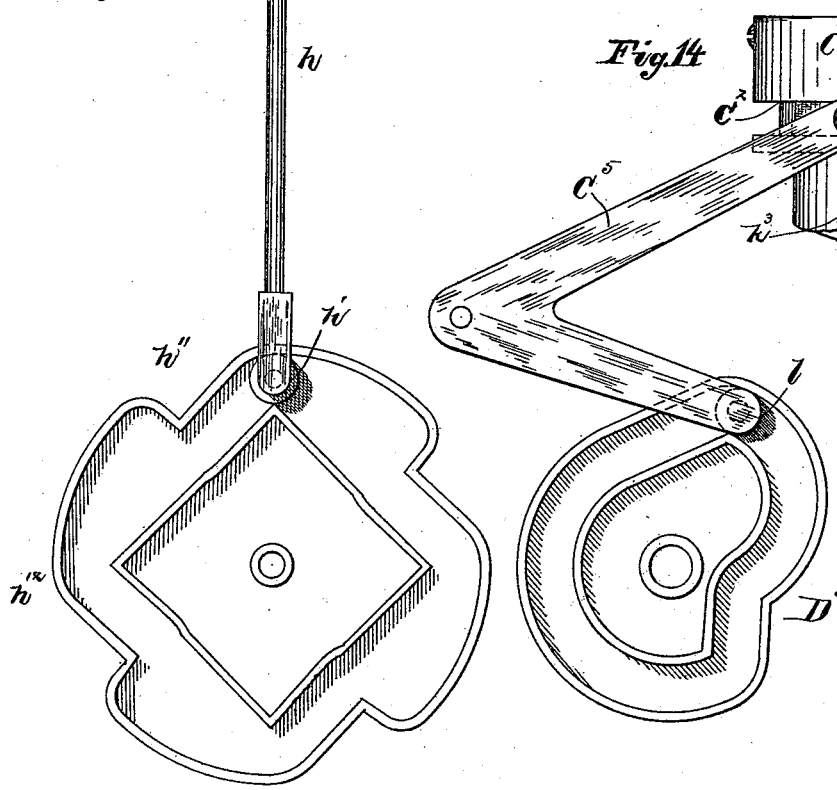
Witnesses.
Inventor.

(No Model.) 6 Sheets—Sheet 4.
F. S. COOK.
NUT TAPPING MACHINE.
No. 438,605. Patented Oct. 21, 1890.
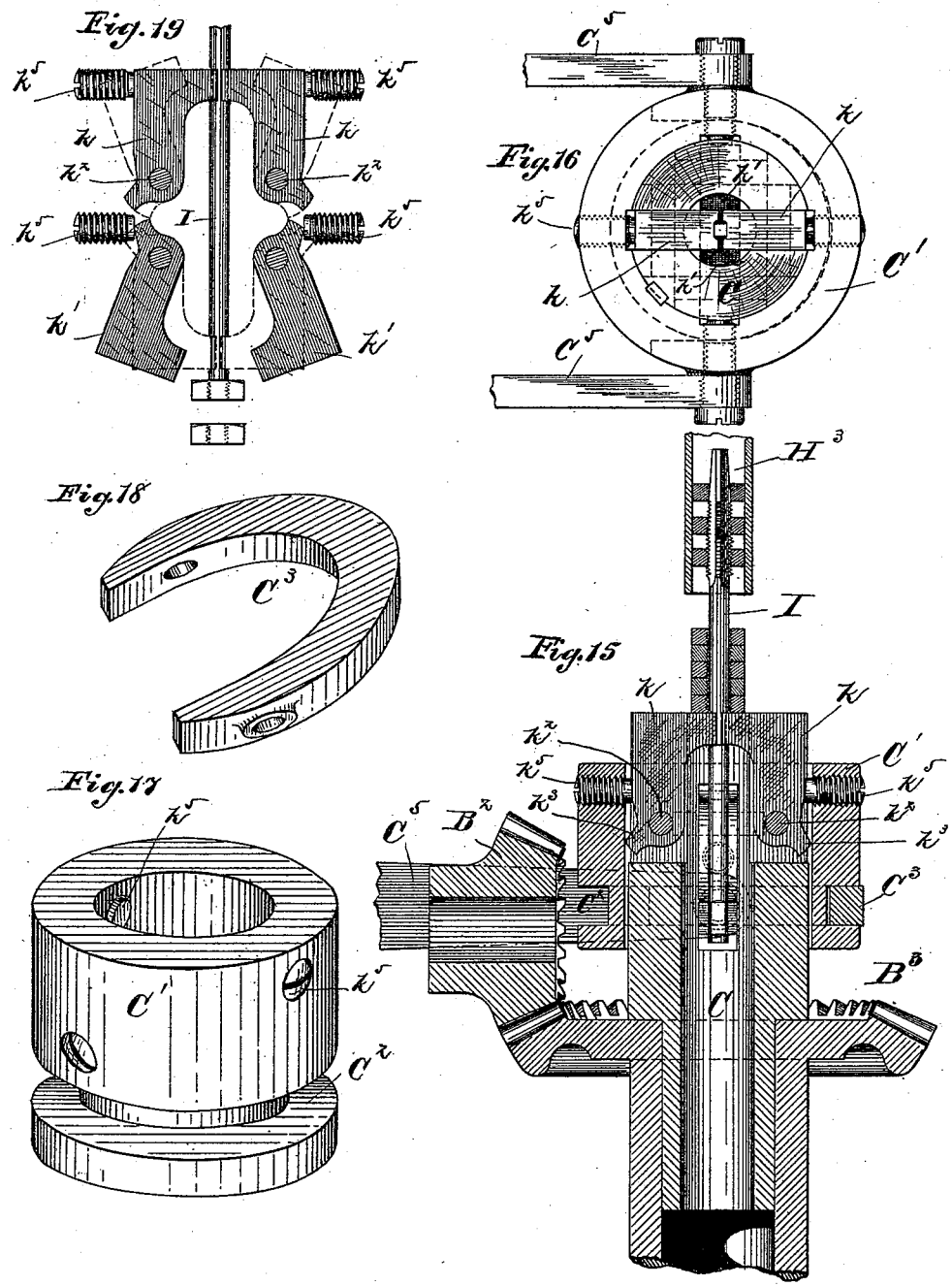
Witnesses.
L. B. Staley.
Inventor,
Frank S. Cook (No Model.) 6 Sheets—Sheet 5.
F. S. COOK.
NUT TAPPING MACHINE.
No. 438,605. Patented Oct. 21, 1890.
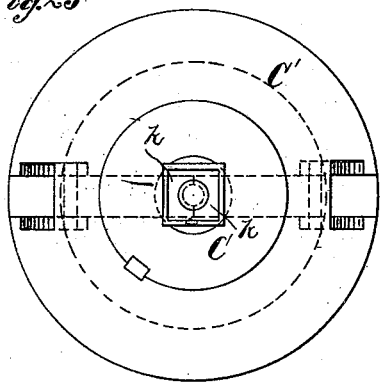
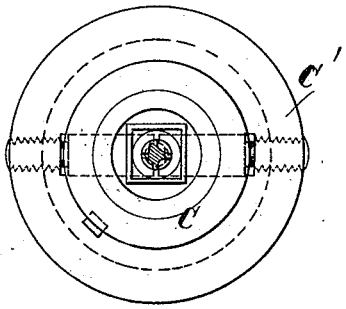
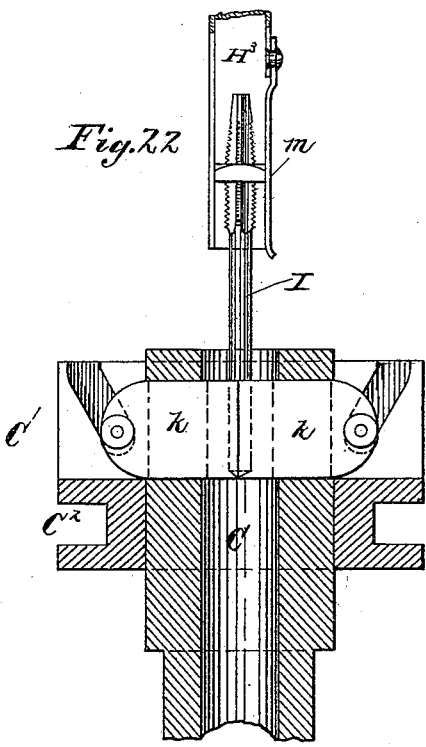
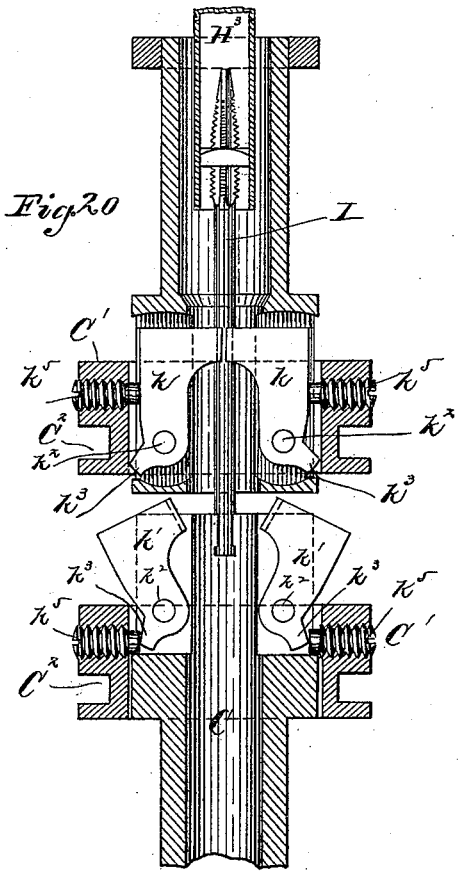
Witnesses. Inventor.

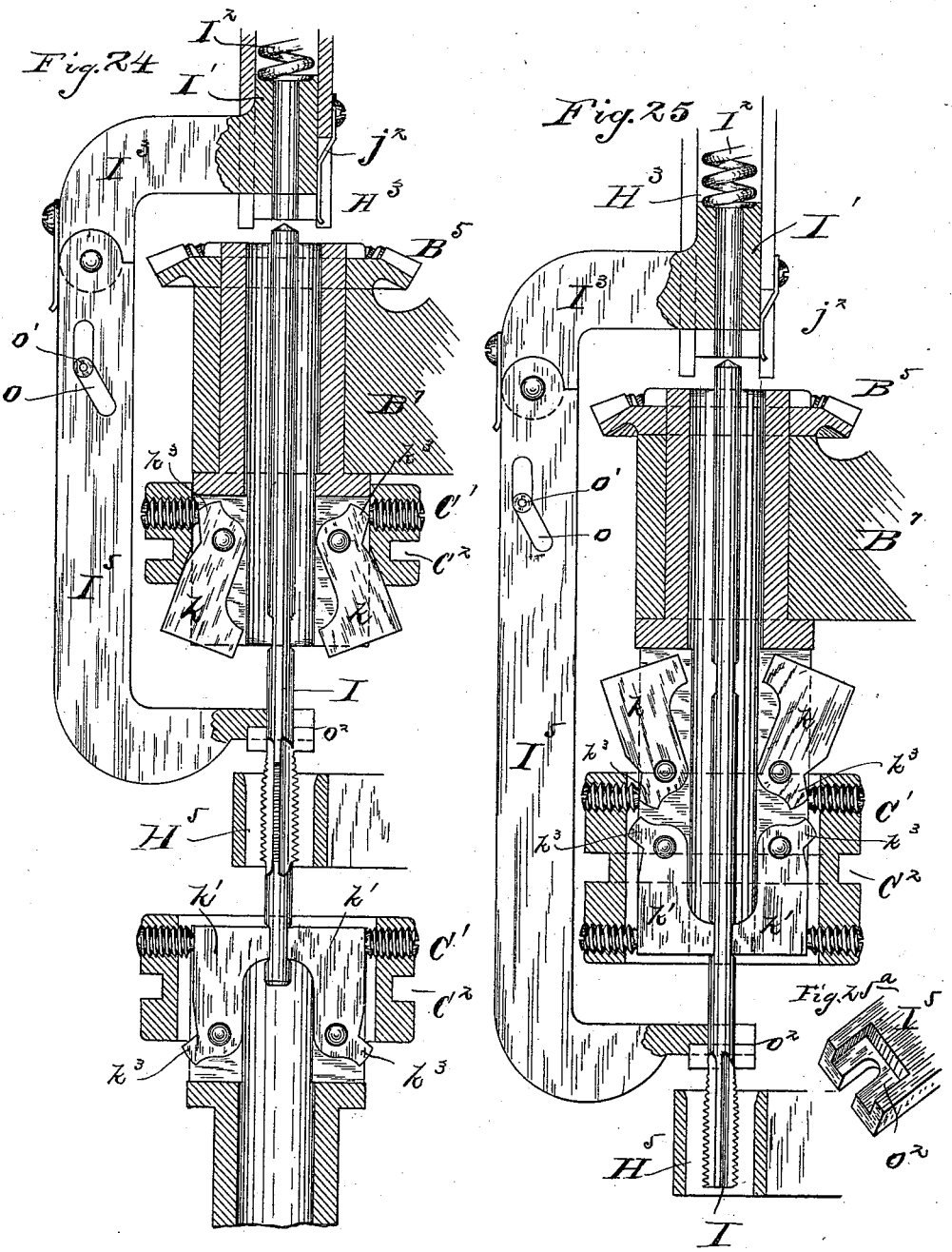

UNITED STATES PATENT OFFICE.

FRANK S. COOK, OF SPRINGFIELD, OHIO, ASSIGNOR, BY DIRECT AND MESNE ASSIGNMENTS, TO WELLS W. LEGGETT AND THOMAS H. SIMPSON, BOTH OF DETROIT, MICHIGAN.

NUT-TAPPING MACHINE.

SPECIFICATION forming part of Letters Patent No. 438,605, dated October 21, 1890.

Application filed October 28, 1886. Serial No. 217,475. (No model.)

*To all whom it may concern:*

Be it known that I, FRANK S. COOK, a citizen of the United States, residing at Springfield, in the county of Clark and State of Ohio, have invented certain new and useful Improvements in Nut-Tapping Machines, of which the following is a specification.

My invention relates to nut-tapping machinery; and the object of my invention is to provide an automatic nut-tapping machine in which the blanks are fed to a vertical tap which is so supported that the nuts may be dropped therefrom without removing the tap from the machine and without changing its position.

My invention consists, first, in a vertical tap supported and adapted to be revolved from below the thread-cutting portion thereof in such a manner that it may be automatically released at intervals to permit the finished nut to drop off of the same.

My invention further consists in a chuck of novel construction whereby the tap is automatically released at one point and at the same time clasped at another point in the length thereof to disengage the finished nut therefrom without stopping the machine.

My invention further consists in a feeding-hopper of novel construction from which the blanks are fed to the thread-cutting mechanism.

My invention further consists in a novel arrangement of parts whereby the quantity of blanks fed from the hopper is regulated to the capacity of the thread-cutting mechanism.

My invention further consists in a novel feeding mechanism by means of which the blanks are conducted from the hopper and fed to the revolving tap.

My invention further consists in various constructions and combinations of parts, hereinafter described, and set forth in the claims.

In various nut-tapping machines heretofore employed it is necessary after a certain number of nuts have been tapped to remove the tap from the machine in order to discharge the finished nuts from the shank of the tap, thus stopping the operation of the machine during the time that the finished nuts are being removed and requiring the operator constantly in attendance thereon.

Machines have been constructed in which the tap is automatically released and turned from a horizontal to a vertical position to permit the finished nuts to drop by their own weight therefrom. In this class of machines, however, the operation of the machine is interrupted during the time that the nuts are being discharged.

In my improved nut-tapping machine herein described I provide an arrangement of mechanism adapted to automatically perform a series of operations, by means of which the blanks are fed from a hopper to which they may be supplied in any suitable manner, automatically fed to the thread-cutting mechanism, the threads tapped therein, and the finished nuts discharged from the tap without any interruption in the working of the machine. I accomplish this result by mechanism illustrated in the accompanying drawings, in which—

Figure 1 is a longitudinal sectional elevational view of a machine embodying my invention. Fig. 2 is a transverse sectional elevational view of the same. Figs. 3 to 8, inclusive, are detail views of the hopper and the mechanism for feeding the blanks therefrom to the feeding mechanism. Figs. 9 to 14, inclusive, are detail views of the feeding mechanism whereby the blanks are fed to the tap. Figs. 15 to 19, inclusive, are detail views of the chuck for holding and revolving the tap and automatically releasing the same at intervals to discharge the finished nuts. Figs. 20 to 25, inclusive, show modifications in the chucking mechanism to accomplish the same result.

Like parts are indicated by similar letters of reference throughout the several views.

In the said drawings, A represents the main frame of the machine, on which the various working parts are supported.

Extending longitudinally through the main frame A is a shaft B, provided at one end with a pulley B', through which the power to turn the machine is supplied, the said shaft being provided at the other end with a beveled pinion $B^2$, adapted to engage with a beveled gear $B^3$, by means of which the chucking mechanism C and the tap secured therein are adapted to be revolved, as hereinafter more fully set forth.

Located within the main frame A on the shaft B, at or near the middle of its length, is worm $B^5$, adapted to engage a worm-gear D, secured on a transverse shaft $D'$, supported at either end in suitable bearings in the main frame A. This worm-gear $D'$ is provided on one side thereof with a cam $D^2$, from which the power to turn the feeding mechanism is supplied in a manner hereinafter more fully set forth.

On either side of the worm-gear $D'$ are cams $D^3$, from which is obtained the required movement to operate the chuck to discharge the finished nut therefrom.

Supported on a standard E from the main frame A is a hopper $E'$, to which the nuts may be supplied in any suitable manner.

The hopper $E'$ is provided near the lower end thereof with a false bottom $E^2$, fixed rigidly to the base $E^3$, on which the hopper is supported. This false bottom stands at an angle in the hopper $E'$, a small opening $a$ being provided in one side of the hopper just above the lowest point of the false bottom $E^2$.

Immediately under the opening $a$, and adapted to receive the blanks which fall therefrom, is a trough or conduit F, through which the blanks are conveyed to the feeding mechanism, as hereinafter more fully set forth.

In order that the blanks may be discharged from the hopper and conveyed to the feeding mechanism with sufficient rapidity to supply the screw-threading mechanism, and at the same time to prevent more than a sufficient quantity to be discharged therefrom, I provide means for agitating the hopper about the false bottom in such a manner that the nuts will be discharged through the opening therein into the trough below, means being provided for automatically stopping or starting the hopper-agitating mechanism, and thus stopping or starting the flow of blanks from said hopper whenever the number of blanks in the conduit is increased or diminished from the given quantity, means being also provided by which the number of blanks in the conduit sufficient to stop or start the agitating mechanism may be varied, as desired. This I preferably accomplish as follows: Supported on a suitable bearing or trunnion $b$, at one end of the base $E^3$, on which the hopper is supported, is a cam-wheel $E^5$, provided on the periphery thereof with a cam-groove $b'$. Supported in a suitable bearing on the base $E^3$ is a reciprocating bar $b^2$, provided at one end with a friction-roller $b^3$, adapted to engage in the cam-groove, and at the other with a rack $b^5$, adapted to engage with gear-teeth $b^7$ on the base proper $E^7$ of the hopper $E'$. Journaled on the bearing or trunnion $b$, at the side of the cam-wheel $E^5$, is a pulley G, to which power may be supplied in a suitable manner from any moving portion of the machine or from any other convenient source of power. The cam-wheel $E^5$ and the pulley G are both journaled loosely on the bearing or trunnion $b$ and independent of each other. A clutch mechanism, however, is provided by means of which a connection may be established between the said parts, so that they may be connected together or disconnected one from the other, as desired. The pulley G is adapted to rotate continuously. The cam-wheel $E^5$ rotates when connected thereto by means of the clutch mechanism and when disconnected therefrom remains at rest. The rotation of the cam-wheel $E^5$ through the medium of the reciprocating slide $b^2$ and the rack $b^5$ produces an oscillatory rotary movement of the hopper $E'$, which causes the blanks to drop through the openings therein into the conduit F.

The false bottom $E^2$ is set at an angle in the hopper $E'$ and remains stationary therein. The opening $a$, as above stated, is located at the lowest point of the said false bottom. If therefore the oscillatory movement of the opening $a$ continues in a horizontal plane, the said opening will pass at either side below the false bottom $E^2$. To obviate this and cause the opening $a$ in its oscillatory movement to follow the line of the false bottom $E^2$, I provide in the bottom $E^7$ of the hopper on either side thereof cam-faces $c$, adapted to come in contact with projections $c'$ on the base $E^3$, the said cam-faces being so constructed that as the hopper is rotated in either direction the contact thereof with the projections $c'$ will cause the hopper to follow the line of the top of the false bottom in its oscillatory movement about the same.

In order that the agitation of the hopper thus provided for may be regulated by the quantity of blanks in the conduit F, I construct the said conduit in two parts, which are hinged together at $d$ at a point below the bottom of the same and provided at the top with projecting lugs $d'$ $d'$, held together by an adjustable spring-connection $d^2$.

Connected to the conduit at or near its outer end is a lever $e$, pivoted to the standard E and extended to a point slightly below the cam-wheel $E^5$. It will be seen now that whenever the quantity of blanks in the conduit is sufficient to compress the spring in the spring-connection $d^2$ the outer end of the conduit will turn down on the hinged connection $d$, which causes the free end of the pivoted lever $e$ to rise and engage the clutch mechanism on the cam-wheel $E^5$, thus disconnecting the said cam-wheel from the revolving pulley G and stopping the agitation of the hopper $G'$.

The conduit F is placed at such an angle that the blanks pass through the same to the feeding mechanism by gravity. Whenever the blanks contained therein have been used up by the feeding mechanism, in the manner hereinafter described, to such an extent that the elasticity of the spring-connection $d^2$ is sufficient to raise the outer end of the conduit, the clutch mechanism on the cam-wheel $E^5$ will be disengaged by the lever $e$ and the agitation of the hopper and the discharge of the blanks therefrom will be resumed.

Any suitable clutch mechanism may be used to form the connection between the cam-wheel and the continuously-rotating pulley G. The construction which I preferably use for this purpose is shown in Figs. 3, 3ª, and 4, and is as follows: Pivoted on the face of the cam-wheel $E^5$ next to the pulley G is a trip-lever $e'$, provided with a projecting arm $e^2$, and in its normal position held against a stop $e^3$ by a spring $e^5$. Journaled on a suitable stud on one of the arms of the pulley E is a small roller $e^7$, adapted when the trip-lever $e'$ is in its normal position to come against the end thereof, as indicated in full lines in Fig. 4, and thus form a connection between said pulley and the cam-wheel $E^5$, causing them to revolve together. When, however, the lever $e$ is raised by the movement of the conduit F, the projecting arm $e^2$ of the trip-lever strikes against the said lever $e$ and turns the said trip-lever to such a position that the roller $e^7$ passes over the face thereof, as indicated in the dotted lines in Fig. 4, thus disengaging the pulley from the cam-wheel. The projecting arm $e^2$, coming against the pivoted lever $e$, forms a stop which prevents the further rotation of the cam-wheel until the lever $e$ is withdrawn therefrom by the return of the conduit to its former position.

It is obvious that the spring-connection $d^2$ between the parts of the conduit may be varied, as desired. I preferably use a small connecting-bolt $d^3$ with a screw-threaded nut having a coiled spring $d^5$ located thereon between the head thereof and one of the connecting-lugs of the conduit.

It will be seen that by varying the tension of the spring the number of blanks required to turn the conduit, and thus cut off the discharge of the blanks from the hopper, may be varied at will.

The conduit F is made of such shape that the blanks as they fall therein and pass downward to the feeding mechanism are gradually turned so as to lie on one of the flat sides thereof. This is accomplished by constructing the conduit at one end in cross-section of a V shape, the sides of which join each other, preferably, at an angle of ninety degrees, the cross-section being gradually changed until it assumes a "channel" shape, the sides and bottom of which join each other at right angles, as indicated in Figs. 5 to 8, inclusive. The lower portion of the conduit F is curved to a vertical position and joins the feed-case H at right angles. The feed-case H contains a T-shaped or three-way chamber, the main portion or stem H' of which stands horizontal and at right angles to the conduit F, which ends therein. The cross portion of the T-shaped chamber stands vertical, and is provided in its upper arm $H^2$ with a spring-plunger of the size and shape of the blank to be tapped, the lower arm $H^3$ being formed in cross-section to correspond with the blank to be tapped and adapted to receive the upper end of the tap I, supported at its lower end by the chuck C, as hereinafter described.

Immediately back of the point where the conduit F joins the chamber H' is a plunger $f$, provided on one side with a trunnion $f'$, adapted to project through an opening $g$ in the cover $H^5$ of the feed-case. (Shown removed in Fig. 9ª.)

On one side of the feed-case H and adjacent to the cover $H^5$ is a pivoted vibrating arm $f^2$, provided with a cam-groove $f^3$, into which the trunnion is adapted to project. The vibrating arm $f^2$ is pivoted to the feed-case and bifurcated at its outer end and connected at $f^7$ to a reciprocating connecting-rod $h$, provided at its lower end with a roller $h'$, adapted to engage in the cam-groove $D^2$ on the worm-gear D. The connecting-rod $h$ is extended above the point $f^7$, at which it is connected to the vibrating arm $f^2$, and is provided at its upper end with a slotted opening $h^2$, through which a connection is formed by a pin $h^3$ with a rock-arm $h^5$, connected at its outer extremity to a trunnion $h^7$. As the cam D is revolved by the worm $D^5$ the connecting-rod $h$ is drawn downwardly, thus producing an oscillatory movement of the arm $f^2$ and the lever $h^5$. The cam-groove $f^3$, engaging the trunnion $f'$ of the plunger $f$, causes the said plunger to advance into the chamber H'. The movement of the lever $h^5$ at the same time presses the spring-plunger I upwardly against the spring $I^2$ until it passes the chamber H'.

The plunger $f$ is provided on the front end with an extended projection $j$, a small lug or projection $j'$ being also formed on the bottom of the chamber H' just in front of the point where the conduit F joins said chamber.

The blanks from the conduit F fall in a vertical position into the chamber H'. As the plunger $f$ advances, each blank is carried forward until the lower edge thereof strikes against the projection $j'$. The lower edge is thus retarded, while the upper edge thereof is carried forward by the outwardly-extending projection $j$ on the plunger $f$. The blank is thus turned longitudinally in the chamber H', and by a further motion of the plunger $f$ is carried forward to a point immediately above the tap I and just below the spring-plunger I'.

To insure the blank coming to the proper place over the tap I and to hold the same at the proper point to be fed onto the tap by the spring-plunger I', a small flat spring $j^2$ is provided in the cover $H^5$ of the feed-case in an opening $j^3$, provided for this purpose. (See Figs. 9ª, 11, and 12.) This spring is made of such shape that the blanks are successively pressed against the side of the case and held thereby in the proper position over the tap until the spring-plunger I' again descends, when it is pressed outwardly, releasing the blank and permitting it to drop onto the tap I.

As the cam $D^2$ continues to revolve, the roller $h'$ passes the point $h^{11}$ in the cam $D^2$, thus releasing the connecting-rod $h$. The spring $I^2$ forces the plunger $I'$ against the blank and presses it onto the tap, causing the tap to engage the same. The cam $D^2$ is so shaped that the roller $h'$ is entirely released after passing the point $h^{11}$, thus permitting the full force of the spring $I^2$ to come against the blank and carry it onto the tap I until it is firmly engaged thereby. As the cam $D^2$ revolves until the roller $h'$ has reached the point $h^{12}$, the connecting-rod $h$ is forced upward to its extreme point by the face of the cam $D^2$, thus returning the plunger $f$ to its normal position.

The plunger $f$ is made of a size to conform to the blanks to be fed, and as it moves forward, carrying each successive blank to the tap, the lower end of the conduit is closed thereby, thus cutting off the supply of blanks therefrom. As the plunger returns to its former position, the end of the conduit is again opened and another blank drops therefrom.

The feeding-plunger $f$ and the spring-plunger $I'$ being both attached to the same connecting-rod and operated by the same cam it will be seen that if rigidly connected together and moved at regular intervals during the operation of the machine it might sometimes happen that the blank had not sufficiently engaged with the tap to permit the spring-plunger $I'$ to reach the limit of its downward stroke. In such a case the feeding-plunger $f$ could not return to its former position without separating the threads in the nut or the giving away of some of the mechanism. By having the slotted opening $h^2$, however, in the connecting-rod $h$ the plunger $f^2$ may be positively returned to its former position at the end of the stroke, no matter what the position of the spring-plunger $I'$ with reference to the tap. The spring $I^2$ is thus permitted to come against the blank to force the same into engagement with the tap I until the plunger $f$ gives its forward stroke, when it is positively withdrawn to make room for another blank.

The chuck C, which carries the tap I, is hollow throughout its length and is secured in beveled gear $B^2$, the hub of which is turned off and adapted to turn in a suitable bearing $B^7$ in the main frame A, the said gear being held against longitudinal movement in said bearing by a collar $B^{11}$ on the end thereof.

The tap is supported in a vertical position with the screw-threaded portion upward, the lower part or shank of the tap being of a sufficient size to permit the nuts to drop off of the tap when released by the chuck mechanism. The tap is adapted to be revolved by the chuck, and means are provided for automatically disengaging the tap at one point when it is engaged at another, thus permitting the finished nuts to drop by their weight from one end of the tap without any intermission in the motion of the mechanism and without changing the longitudinal position of the tap. I preferably accomplish this as follows: The main portion of the chuck C consists of a sleeve provided at different points in the length thereof with two pairs of jaws $k\ k$ and $k'\ k'$. These jaws are adapted to grasp the tap at different points in the length thereof, and are preferably placed at right angles to each other, or at a distance of ninety degrees apart in the circumference of the sleeve, as shown in Figs. 15 and 16, although it is obvious that they may be supported in the same vertical plane, as shown in Fig. 19, or in any other relative position. The jaws $k\ k$ and $k'\ k'$ are each pivoted in a slotted opening in the sleeve C by means of pins $k^2$, and are each provided at the bottom with a cam projection $k^3$. (See Figs. 15 and 19.) Surrounding the supporting-sleeve C is an outer collar or sleeve $C'$, provided in its periphery with a groove $C^2$, and provided with adjustable projections $k^5$, adapted to bear against the outer surface of the jaws $k^2$. The collar $C'$ is adapted to revolve with the sleeve C, and is also capable of a longitudinal movement thereon. As the collar $C'$ is moved longitudinally in either direction, the projections $k^5$ therein come against the cam projections $k^3$ on the respective jaws, causing the said jaws to separate, thus releasing the tap, the projections being so placed on the collar $C'$ that when one pair of jaws is being opened the other pair is closed tightly against the tap.

Fitting loosely in the groove $C^2$ of the collar is a U-shaped piece $C^3$, to which is pivoted at either side thereof a bell-crank lever $C^5$, each pivoted to the main frame A and provided with a roller $l$, adapted to engage in the respective cams $D^3\ D^3$ on the transverse shaft $D'$.

Both pairs of jaws engage the tap I at different points on the length thereof at each revolution of the transverse shaft $D'$. The collar $C'$, by means of the cams $D^3\ D^3$ and the bell-crank $C^5$, is caused to reciprocate longitudinally upon the sleeve C, the shape of the cams being such that the upper jaws of the chuck are opened and closed, after which the lower jaws are opened and closed, one pair of jaws remaining closed during the time the other pair of jaws are opened.

The projections $k^5$, which serve to open and close the respective jaws by the longitudinal movement of the collar $C'$, are preferably formed in the nature of set-screws, the ends of which are flattened to bear against the respective jaws. These screws may be readily adjusted to compensate for any weight upon the operative parts, and at the same time furnish means for readily removing the tap, when desired, by loosening one or more of the set-screws, allowing the jaws supported thereby to open.

The cams $D^2$ and $D^3$, which operate the feeding mechanism and clutching mechanism, respectively, are both rigidly secured to the transverse shaft D'. The cams D² are adapted to make one complete movement of the clutching mechanism at each revolution of the shaft D'. The cam D² is so formed that several complete movements of the feeding mechanism are accomplished at each revolution of the shaft D'. (See Figs. 13 and 14.) By this arrangement a given number of blanks are fed to the tap, and tapped thereby between each discharge of the clutching mechanism.

From the above description it is thought that the operation of the machine will be readily understood. The blanks are fed from the hopper by the agitation thereof into the conduit below, by which they are fed into the feeding mechanism. The feeding mechanism carries the blanks successively to a point over the tap and forces them into engagement therewith. The blanks are each held from revolving by the lower portion of the three-way chamber in the feed-case and are drawn down by the tap in the operation thereof until they drop by their own weight against the upper jaws $k$ of the chuck mechanism. When a given number of finished nuts have accumulated on the top of the jaws, the said jaws are opened by a longitudinal movement of the collar surrounding the same, permitting the finished nut to drop onto the lower jaws, after which the upper jaws are again closed and the lower jaws opened, thus discharging the finished nuts through the sleeve C into a suitable receptacle below, after which the lower jaws return to their former position, and the operation of the machine is repeated.

It is obvious that the chucking mechanism may be variously modified and still accomplish the same result. Instead of a vertical chuck provided with a double set of jaws, two or more chucks may be employed, as shown in Figs. 20 and 21, Fig. 20 being a sectional elevation and Fig. 21 a plan of the same.

Instead of having the jaws pivoted in the sleeve and adapted to oscillate therein, they may be constructed so as to move laterally and be operated by suitable cam tracks or grooves, as shown in Figs. 22 and 23.

In Fig. 22 I have shown a clamping mechanism consisting of a spring $m$, adapted to press against the respective blanks when they are being tapped, and thus hold them in position. By this construction one set of jaws only need be employed, the clamping mechanism being adapted to hold the blanks, and thus support the tap during the time the jaws are opened to discharge the nuts.

It is obvious that the nuts instead of being fed onto the free end of the tap and discharged through the chuck, might be fed through the chuck and discharged by gravity from the free end; or the threaded portion of the tap might be located between the points at which the said tap is engaged by the chuck, the nuts being fed to the tap over one point at which the tap is adapted to be engaged and discharged over the other. This may be accomplished as shown in Figs. 24 and 25, an arm I³ being constructed on the plunger I' and provided with a hinged portion I⁵, adapted as the plunger I' is reciprocated up and down to be drawn out and in by means of a cam-track $o$ and a cam-roller $o'$. The hinged portion I⁵ is provided at the lower end with a chamber or socket $o^2$, adapted as the plunger advances to engage the respective blanks and force them on the threaded end of the tap and prevent them from turning until they have entered the holding-chamber H⁵. The outward movement of the hinged arm I⁵ of the cam-track $o$ permits the nuts to successively pass the lower part of said arm, after which they are engaged thereby.

Instead of having the tap vertical, it might be placed at any suitable angle so long as the nuts are adapted to be discharged therefrom by gravity.

Various other modifications may be employed without departing from the spirit of my invention, and I do not, therefore, limit myself to the constructions shown and described.

Having thus described my invention, I claim—

1. The combination, with a feeding-hopper, of a conduit adapted to convey the blanks therefrom, means for agitating said hopper, and a clutch mechanism between said conduit and agitating mechanism, adapted to automatically connect and disconnect the said agitating mechanism by a variation of the quantity of blanks in said conduit, substantially as set forth.

2. The combination, with a feeding-hopper provided with a false bottom at an angle therein, of an opening in the said hopper at or near the lower edge of said false bottom and means for alternately rotating said hopper around the said false bottom, and at the same time raising it to cause the opening to move parallel to the plane of the false bottom, substantially as set forth.

3. The combination, with a hopper and means for agitating said hopper to cause the blanks to be fed therefrom, of a pivoted conduit adapted to receive said blanks, an elastic connection supporting the pivoted conduit, a clutch mechanism adapted to stop and start the said hopper, and a connection from said clutching mechanism to the pivoted conduit, whereby the movement of said conduit is adapted to stop and start the said hopper, substantially as specified.

4. The combination, with a feeding-hopper, of a conduit adapted to convey the blanks therefrom, said conduit being formed of a varying cross-section in the length thereof, adapted as the blanks pass successively therethrough to bring the said blanks to a uniform position, substantially as set forth.

5. The combination, with the hopper provided with a false bottom at an angle therein, an opening in said hopper at or near the lower part of said false bottom, and cam-faces on the bottom proper of said hopper, adapted to be engaged by cam projections as the hopper is rotated, and thus raise and lower the said hopper, of a cam-wheel adapted to produce an alternating rotary motion of said hopper and a continuously-revolving mechanism adapted to be connected and disconnected to and from said cam-wheel, substantially as set forth.

6. The combination, with a hopper, a false bottom at an angle therein, an opening in said hopper, and cam faces and projections under said hopper, of a reciprocating bar provided at one end with a rack adapted to engage teeth on said hopper, substantially as set forth.

7. The combination, with the hopper, the false bottom at an angle therein, an opening in the side of said hopper, and the cam faces and projections under said hopper, of a reciprocating bar provided with a rack adapted to engage teeth on said hopper, a cam-wheel adapted to operate said reciprocating bar, and a clutch mechanism on said cam-wheel, adapted to automatically engage and disengage the same from a continuously-rotating mechanism, substantially as set forth.

8. The combination, with a hopper, a cam-wheel adapted to operate the said hopper to discharge the blanks therefrom, and a clutch mechanism on said cam-wheel adapted to engage and disengage the same with and from a continuously-revolving mechanism, of a conduit adapted to receive the blanks discharged from said hopper, and a pivoted connection from said conduit to said clutch mechanism, whereby the variation of the blanks therein will automatically operate the said clutch mechanism, substantially as set forth.

9. The combination, with a vertically-revolving tap, of a feeding mechanism adapted to feed the blanks respectively over said tap at right angles thereto, and a spring-plunger adapted to force the blanks on said revolving tap, substantially as set forth.

10. The combination, with the vertically-revolving tap, of a three-way feeding-chamber, into one arm of which the said tap is adapted to extend, a spring-plunger over said tap in another arm of said chamber, and a reciprocating plunger adapted to move back and forth and feed the blanks successively between said tap and spring-plunger, substantially as set forth.

11. The combination, with a feeding-chamber provided with a spring-plunger over the vertically-revolving tap and a reciprocating plunger at right angles thereto, of a conduit opening into said chamber and adapted to feed the blanks therein, and means for turning the blanks to a horizontal position at the same time they are fed between the tap and the spring-plunger by the reciprocating plunger, substantially as specified.

12. The combination, with the hopper and a conduit leading therefrom, said conduit being connected to a feeding-chamber and curved so as to deliver the blanks vertically therein, of a reciprocating plunger in the said feeding-chamber, adapted to press the blanks forward over the vertically-revolving tap, and at the same time to turn it to a horizontal position, substantially as set forth.

13. The combination, with a conduit and a feeding-chamber, of a reciprocating plunger adapted to press the blanks forward from said conduit to a point immediately above the vertically-revolving tap, a clamping device for holding the blank over the tap, and means for automatically pressing the blank onto said tap, substantially as set forth.

14. The combination, with the revolving tap, of the spring-plunger in a line therewith and the reciprocating plunger at right angles thereto, said plungers being operated from a single connecting-rod and adapted, respectively, to press the blank into engagement with the tap and feed the said blank to said tap, and means for permitting an independent movement of said plungers, substantially as set forth.

15. The combination, with the feeding-chamber, of a conduit adapted to convey the blanks in a continuous stream to said chamber and a feeding-plunger in said chamber adapted to automatically feed the blanks at intervals to the tapping mechanism, and at the same time cut off the supply of blanks from the conduit, substantially as specified.

16. The combination, with the feeding-chamber and the revolving tap extended therein, of the spring-plunger over said tap and the rock-arm attached to said plunger, the reciprocating plunger at right angles to said spring-plunger, and the vibrating arm provided with a cam-groove adapted to engage said feeding-plunger, the said rock-arm and vibrating arm being attached to a common connecting-rod by means which permit an independent movement thereof, substantially as set forth.

17. The combination, with the feeding-chamber and the revolving tap, of the conduit leading to said chamber, the feeding-plunger having the forwardly-projecting shoulder thereon, the stop projections in said chamber, the clamping-spring over said tap, the spring-plunger at right angles to said feeding-plunger, and means for simultaneously moving said plunger at intervals to feed the blanks, substantially as set forth.

18. The combination, with the vertical tap, of the revolving sleeves having two pairs of jaws therein, adapted to engage said tap, a longitudinally-moving collar around said sleeve, and means for opening and closing said jaws alternately as the collar is moved longitudinally, substantially as and for the purpose set forth.

19. The combination, with the sleeve C, of the jaws pivoted therein, the sliding collar C', having projections therein adapted to engage said jaws, means for revolving said sleeve, and means for automatically-reciprocating said collar at intervals after a given number of revolutions of said sleeve, substantially as set forth.

20. The combination, with the agitating hopper, the conduit leading therefrom, the feeding-chamber having the feeding-plunger, and spring-plunger at right angles to each other, of the vertical tap supported by a chuck mechanism provided with automatically and alternately opening jaws, the said parts being so timed one with the other as to automatically feed the blanks to the tap and discharge the finished nuts therefrom without removing the tap or interrupting the operation of the machine, substantially as set forth.

21. The combination, with the main shaft, of the beveled gear supporting a sleeve therein, the alternately-opening jaws in said sleeve, the reciprocating collar about said sleeve, adapted to open and close said jaws, the transverse shaft provided with cam-wheels connected to said main shaft, and means for connecting said cam with said collar, substantially as set forth.

In testimony whereof I have hereunto set my hand this 25th day of September, A. D. 1886.

FRANK S. COOK.

Witnesses:
CHASE STEWART,
ED. J. COOK.